United States Patent [19]

Sweeney

[11] Patent Number: 4,965,716
[45] Date of Patent: Oct. 23, 1990

[54] FAST ACCESS PRIORITY QUEUE FOR MANAGING MULTIPLE MESSAGES AT A COMMUNICATIONS NODE OR MANAGING MULTIPLE PROGRAMS IN A MULTIPROGRAMMED DATA PROCESSOR

[75] Inventor: Michael A. Sweeney, Manassas, Va.

[73] Assignee: International Business Machines Corporation, Armonk, N.Y.

[21] Appl. No.: 167,265

[22] Filed: Mar. 11, 1988

[51] Int. Cl.⁵ .......................... G06F 7/06; G06F 7/04
[52] U.S. Cl. ................................ 364/200; 364/242.6; 364/244; 364/244.3; 364/242.8; 364/242
[58] Field of Search ... 364/200 MS File, 900 MS File

[56] References Cited

U.S. PATENT DOCUMENTS

| | | | |
|---|---|---|---|
| 3,647,348 | 3/1972 | Smith | 364/200 |
| 3,676,860 | 7/1972 | Collier | 364/200 |
| 4,054,945 | 10/1977 | Ichiko et al. | 364/200 |
| 4,232,294 | 11/1980 | Burke | 364/200 |
| 4,271,468 | 6/1981 | Christensen | 364/200 |
| 4,352,157 | 9/1982 | Namimoto et al. | 364/200 |
| 4,358,829 | 11/1982 | Branigin et al. | 364/900 |
| 4,482,956 | 11/1984 | Tallman | 364/200 |
| 4,488,218 | 12/1984 | Grimes . | |
| 4,488,227 | 12/1984 | Miu et al. | 364/200 |
| 4,530,054 | 7/1985 | Hamstra | 364/200 |
| 4,530,055 | 7/1985 | Hamstra | 364/200 |
| 4,642,758 | 2/1987 | Teng | 364/200 |
| 4,680,757 | 7/1987 | Murakami | 340/825.5 |
| 4,713,758 | 12/1987 | Dekelaita et al. | 364/200 |
| 4,733,367 | 3/1988 | Taniguchi | 364/900 |
| 4,757,440 | 7/1988 | Scheuneman | 364/200 |
| 4,773,041 | 9/1988 | Hassler | 364/900 |
| 4,794,526 | 12/1988 | May | 364/200 |
| 4,843,541 | 6/1989 | Bean | 364/200 |

OTHER PUBLICATIONS

H. A. Carlson et al., "Dynamic Priority Method for Buffer Stack," IBM TDB, Apr. 1966, pp. 826–828.
M. J. Alleger et al., "Dynamic Bubbling Task Dispatching Algorithm," IBM TDB, Jun. 1970, pp. 196–197.
J. G. Earle, "Dynamic Memory for Program Staging," IBM TDB, Apr. 1971, pp. 3435–3437.
G. M. Abshire, "Dynamic Quickcell," IBM TDB, Jul. 1974, pp. 361–364.
H. J. Melville, "Dynamic Prioritization of Queued Interrupts," IBM TDB, Apr. 1986, pp. 4873–4875.

Primary Examiner—David Eng
Assistant Examiner—Eric Coleman
Attorney, Agent, or Firm—John E. Hoel; Mark A. Wurm

[57] ABSTRACT

In processing a priority queue, the elements are kept in an unsorted stack and are searched for the next highest priority element only after the highest priority element has been read from the holding register. Each time a new element is written into the queue, a comparison is made of the priority of the new element with the priority of the existing element in the holding register. If the new element has a higher priority, then the existing element in the holding register is written onto the top of the stack. Alternately, if the element in the holding register has the higher priority, then the new element is written onto the top of the stack. This assures that the holding register always contains the element having the highest priority. Therefore, a read of the priority queue by reading the contents of the holding register guarantees that the highest priority element is there and it can be accessed immediately without further searching the queue.

3 Claims, 5 Drawing Sheets

FAST ACCESS PRIORITY QUEUE FOR MANAGING MULTIPLE MESSAGES AT A COMMUNICATIONS NODE OR MANAGING MULTIPLE PROGRAMS IN A MULTIPROGRAMMED DATA PROCESSOR

BACKGROUND OF THE INVENTION

1. Technical Field

The invention disclosed broadly relates to data processing architecture and more particularly relates to improved data queue architectures.

2. Background Art

In many data processing applications, data is associated with an inherent priority for its manipulation. For example, in local area network contention resolution where several nodes connected to the network must contend for access to a common resource, it makes sense to give preferred service to those nodes whose data transmission requirements are inherently more important to the overall operation of the network. Typically, the prior art has stored the data descriptors pointing to the several sessions being handled by a node, into a prioritized order called a priority queue. As each new session and its associated priority is assigned to a particular node, that session must be organized by its priority with respect to the priorities of the existing sessions at that node. In the prior art this has been done by examining the contents of the prioritized queue representing the several existing sessions, and writing the new session descriptor into the queue at a position which is ranked in accordance to its priority value. Thus, after the writing of a new session descriptor to a priority queue at a node, the resultant queue will be organized in the order of the priority of the sessions now assigned to it. A problem arises with respect to this mode of operation, since the occurrence of assignments of new sessions to a node is random in time. Because of the asynchronous occurrence of new events or sessions which must be recorded in the prioritized queue, it becomes difficult for the prior art prioritized queue mechanisms to quickly and repeatedly respond to the entry of new data into the queue since each entry requires the assessment as to the relative priority of the new element with respect to the priorities of existing elements in the prioritized queue.

There are other data processing applications where prioritized queues are used, for example, in multiprogramming applications. One type of multiprogramming computer architecture is the work step architecture wherein multiple programs are executed by the single resource CPU by imposing a time sliced operation on the execution of each respective program. The time dimension is divided into periods and each of the several programs to be executed by the CPU is assigned a relative priority for execution. At the beginning of each time sliced period, the priority of each respective program is examined and that program having the highest priority is selected for execution during that time sliced period. Where the programs or their subroutines are assigned on an event-driven basis, the augmentation of the priority queue representing the programs to be executed, must occur in a manner which is asynchronous to the time sliced operation of the multiprogramming process. If the priority queue that keeps track of which of the several programs has the highest priority for execution during the next cycle, must be reorganized every time a new program or subroutine has its priority assigned to the queue, then the system will not be able to tolerate a rapid repetition of assignments of new programs to the priority queue and, at the same time, make available to the system an accurately identified highest priority program for execution during the next cycle.

OBJECTS OF THE INVENTION

It is therefore an object of the invention to manage a priority queue in a more efficient manner than has been available in the prior art.

It is another object of the invention to manage a priority queue in a faster manner than has been available in the prior art.

It is still a further object of the invention to operate a priority queue so as to enable the asynchronous assignment of new elements to that queue in a faster manner than has been available in the prior art.

It is still a further object of the invention to make the top element of a priority queue immediately available in an improved manner.

SUMMARY OF THE INVENTION

These and other objects, features and advantages of the invention are accomplished by the fast access priority queue disclosed herein. In accordance with the invention, in processing a priority queue, the elements are kept in an unsorted stack and are searched for the next highest priority element only after the highest priority element has been read from the holding register. The invention can do this because each time a new element is written into the queue, a comparison is made of the priority of the new element with the priority of the existing element in the holding register. If the new element has a higher priority, then the existing element in the holding register is written onto the top of the stack. Alternately, if the element in the holding register has the higher priority, then the new element is written onto the top of the stack, thus assuring that the holding register always contains the element having the highest priority. Therefore, a read of the priority queue by reading the contents of the holding register guarantees that the highest priority element is there and it can be accessed immediately without further searching the queue. As previously stated, it is only after reading the contents of the holding register that one engages in a searching operation. Interestingly enough, in order to provide for a quick second read operation, one initially inserts the element at the top of the stack into the holding register. Then the priority searching operation can be carried out wherein each remaining element in the priority queue has its priority compared with that of the contents of the holding register. Whenever the priority of the element in the holding register is less than the priority of an element encountered in the priority queue, a swapping operation takes place. By the time the searching operation gets to the bottom of the stack, the holding register contains the queue element having the highest priority.

DESCRIPTION OF THE FIGURES

These and other objects, features and advantages of the invention will be more fully appreciated with reference to the accompanying figures.

DESCRIPTION OF THE PREFERRED EMBODIMENT

Figure 1:
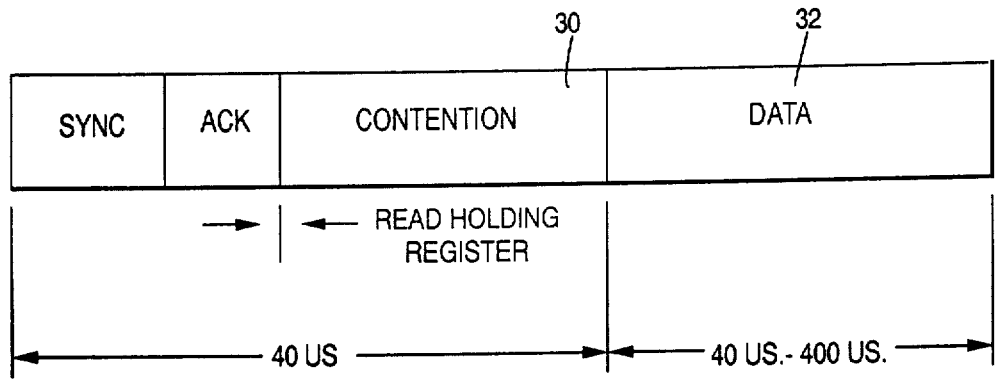
FIG. 1 is an illustration of an example format for the cyclic timing of an application, such as a local area network application within which the invention can be employed.
Figure 3:
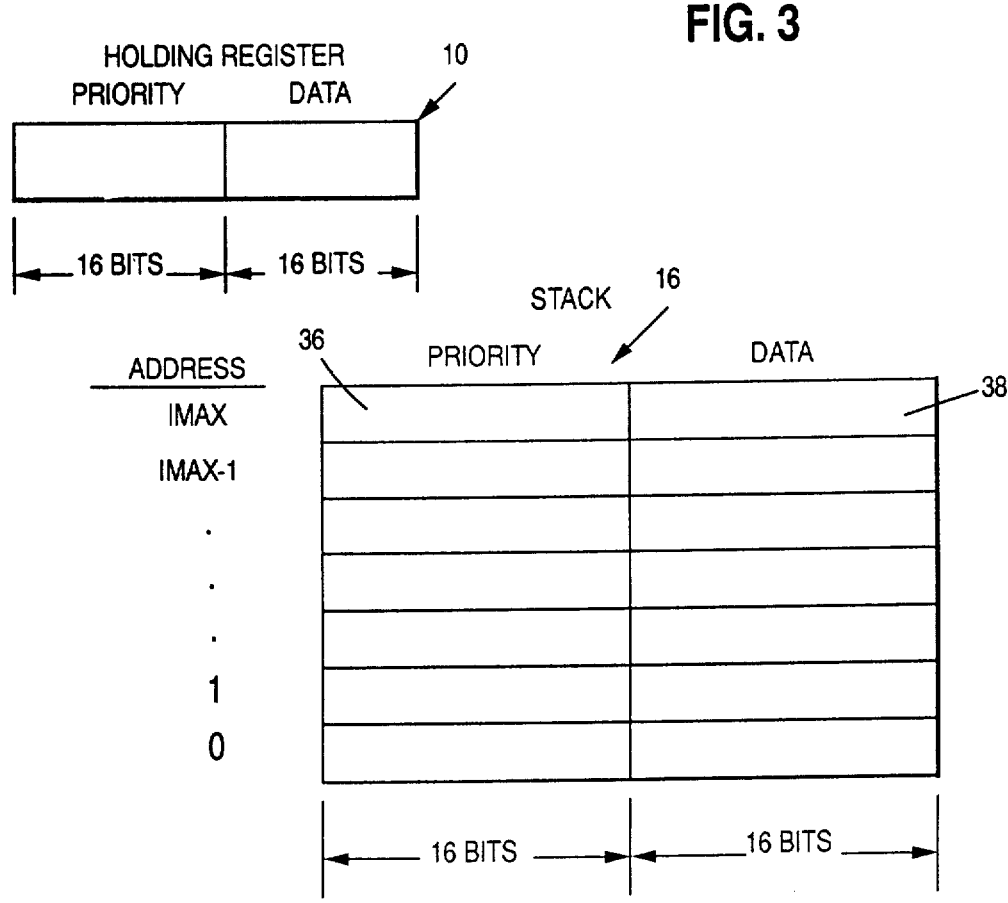
FIG. 3 is a schematic diagram of the stack and the holding register, in accordance with the invention.
Figure 5:
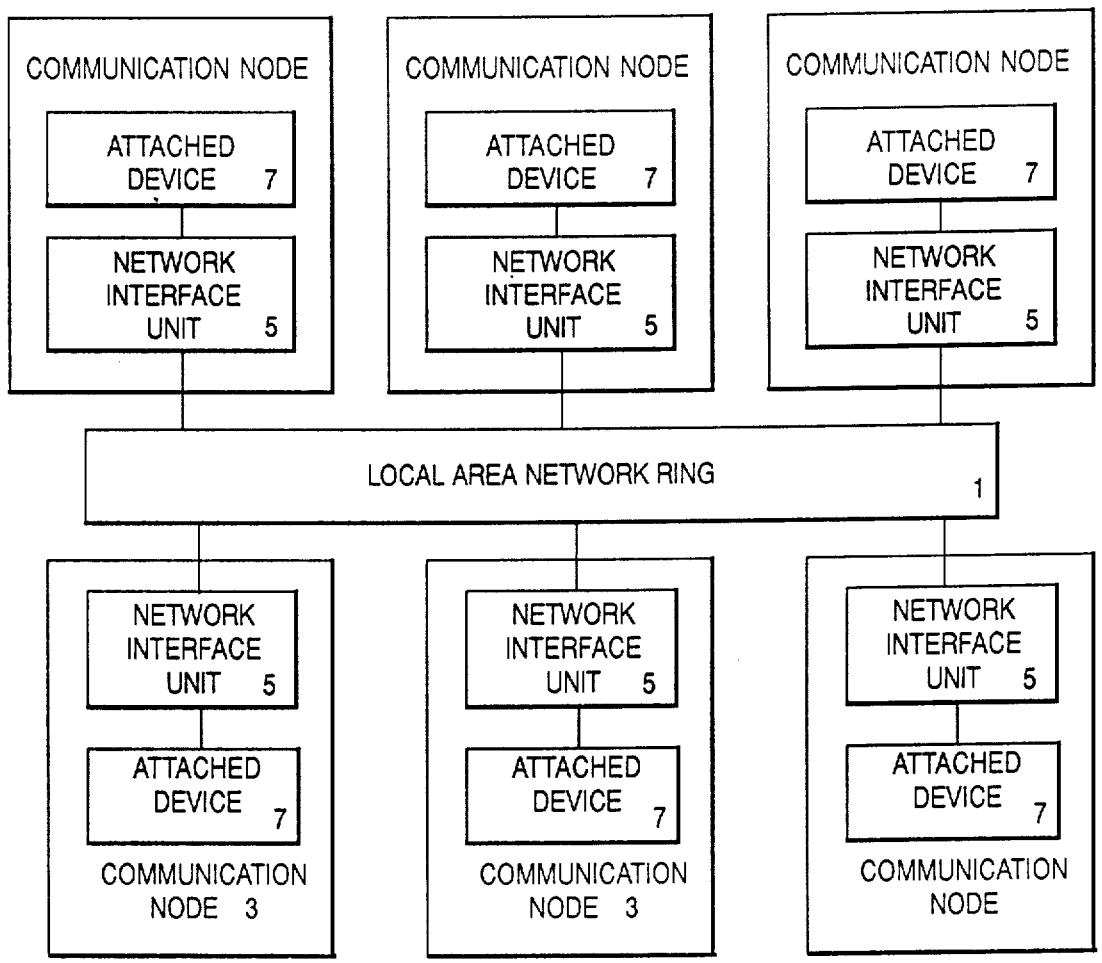
FIG. 5 is a architectural diagram of a local area network wherein session priority management can be accomplished in accordance with the invention.

The fast access priority queue invention operates in data processing applications where there is some regularity as to the instant when the priority queue is to be read. This is illustrated, for example, by the timing frame shown in FIG. 1 for a local area network, such as that shown in FIG. 5. In a local area network such as that shown in FIG. 5, a central communications link such as a ring 1, or alternately a star coupled BUS logically interconnects a plurality of communications nodes, for example 3 and 3', each node including a network interface unit 5 and a local utilization device such as a computer, data interface, or other data processing communications device or terminal device 7. In many local area network applications, each respective node will have its network controller 5 responsible for managing a plurality of communications sessions with a plurality of other nodes. Each communications session to be managed in a network interface unit 5 will have an associated priority value assigned to it which denotes the inherent relative importance of that communication session with respect to other communication sessions which are to be managed by that particular node 3 and by other nodes 3' in the system. It is in such an application that the invention finds particular utility. In order to provide all nodes and all sessions in the network with an opportunity to transmit their information, the time dimension is divided into a sequence of time frames such as that shown in FIG. 1. A time frame can include a control portion which has a synchronizing header and an acknowledgement portion in the beginning, followed by a contention resolution interval 30. The frame will then have a data portion 32 following the control portion during which that node and that session within a node for which the highest priority has been determined during the contention resolution portion of the frame, will have its associated data transmitted over the communications medium 1 to the destination node in the system. Typically, the control portion of a frame will be 40 microseconds, for example, and the data portion of the frame can be a variable duration from, for example, 40 microseconds up through 400 microseconds. In order for a particular node to choose a candidate session for the contention resolution phase of the control portion of the time frame of FIG. 1, the network interface unit 5 must maintain a priority queue. The priority queue will contain therein a stack 16 such as that shown in FIG. 3 which includes entries or elements which have two parts. The first part of an entry in the stack of FIG. 3 is the priority value 36 for that entry and it is that priority value which must be compared with other priority values for other sessions during the contention resolution portion of the control portion of the time frame of FIG. 1. In addition to the priority portion of an entry in the stack of FIG. 3, there is a data portion 38 associated with the priority portion. In the example to be discussed herein, that data portion can be an address pointer which points to the data which is stored in association with the network interface unit 5, which is to be transmitted for the selected communication session. The data portion 38 of an entry into the stack 16 of FIG. 3 could also be actual data, or indeed, the actual data portion of a message packet to be transmitted over the communications network 1. It is within this type of application that the invention finds particular utility.

Figure 2:
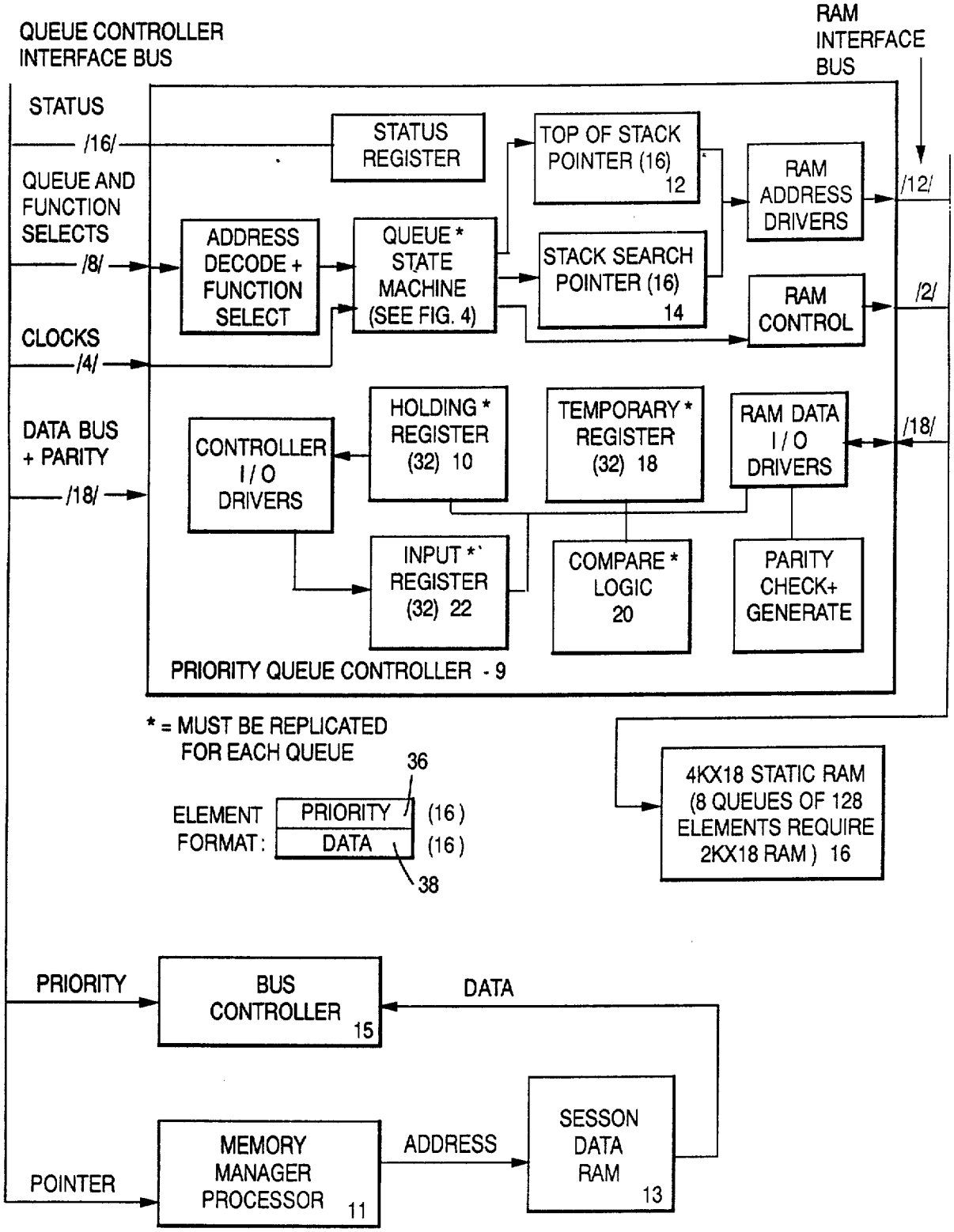
FIG. 2 is an architectural diagram of the invention.

FIG. 2 is an architectural diagram of the fast access priority queue controller 9, showing how it is interconnected with the memory management processor 11 and the session data RAM 13 to select the highest priority session using the BUS controller 15, the data for which will be output onto the communications network 1 if this node wins the priority contention resolution. The queue controller 9 will maintain the stack 16 with entries each containing the priority for the entry and an address pointer. When the queue and function select input indicates to the queue controller 9 that the highest priority element is to be read from the stack and output, the highest priority element is output from the stack with the priority portion being applied to the BUS controller 15 and the pointer portion being applied to the memory manager processor 11. The pointer portion will be used by the memory processor to identify the data segment in the session data RAM 13 which is to be transmitted over the communications link if the priority contention resolution is won. The BUS controller 15 will use the priority value 36 to participate in the BUS contention resolution operation on the communications network 1.

Figure 4:
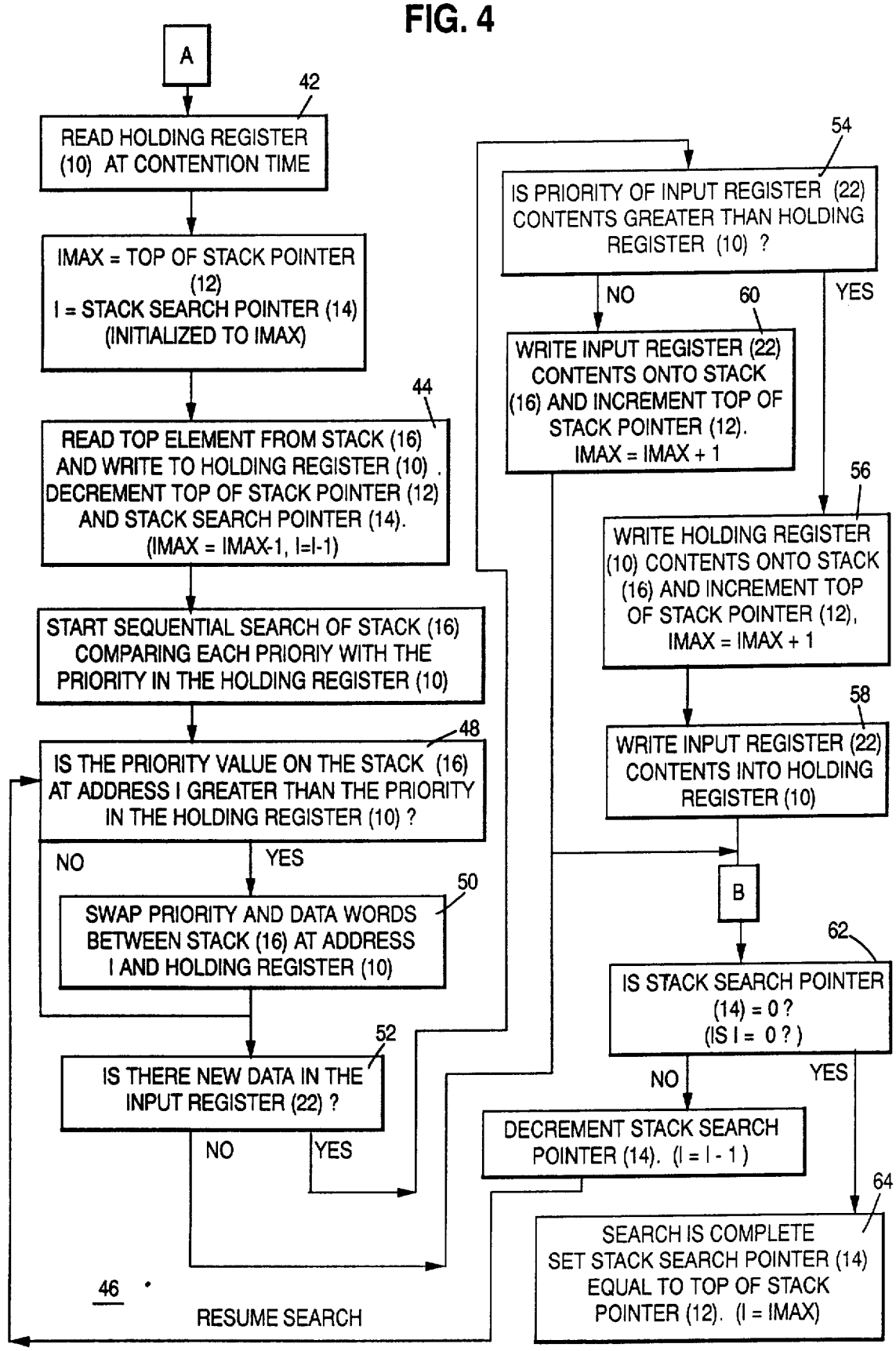
FIG. 4 is a flow diagram of the sequence of operational steps carried out by the invention.

The queue controller 9 shown in FIG. 2 includes a queue state machine 40 which runs the process depicted in the flow diagram of FIG. 4. The queue state machine has outputs to the top of stack pointer 12, the stack search pointer 14, and the RAM control which is connected to the stack 16 which stores the stack entries as previously described. The queue controller 9 also includes the holding register 10, the temporary register 18, the input register 22 and the compare logic 20.

In operation, let us assume that the stack 16 of FIG. 3 has stored in it a plurality of stack entries, each of which includes a priority portion and a data portion. The bottom of the stack has a fixed value and for this example can be an address value of 0, and the top of the stack is indicated by the contents of the top of stack pointer 12 which is referred to as Imax. In the time frame of FIG. 1, when at the end of the acknowledgement portion of the control portion of the frame, for example, the queue controller 9 will receive an input on the queue and function select input line requesting that the highest priority entry from the stack 16 be accessed. At this point, in the flow diagram of FIG. 4, the holding register 10 which currently contains the highest priority entry, is read at 42 and its value is output on the controller I/O driver and over the data BUS to the BUS controller 15 and the memory manager processor 11, as was previously described. Then, as is indicated in the flow diagram of FIG. 4, the contents of the stack 16 at the top of the stack which is pointed to by the top of stack pointer 12, is read at 44 and that value is the entry value which is now written into the holding register 10. At this time, the value of the top of stack pointer 12 is decremented by unity, indicating that the top of the stack is now at the next lower address value for the stack 16.

The contents of the holding register 10 is immediately available for accessing from the queue controller 9, in accordance with the invention. Now that the queue controller 9 has been able to quickly respond to the queue and function select request at the end of the acknowledgment portion of the time frame, the queue controller 9 has a latency period until the occurrence of the next control portion of the next time frame. It is during this latency portion that the stack 16 can be searched and the identity of the element having the highest priority identified and placed in the holding register 10. This is performed by a loop 46 which is indicated in the flow diagram of FIG. 4. The loop is started at 48 with the sequential search of the stack 16 by means of the stack search pointer 14 pointing to the top of the stack by having the same contents as the top of stack pointer 12. The contents of the priority portion of the entry in the stack pointed to by the stack search pointer 14 is compared with the priority value for the entry stored in the holding register 10. If the priority value of the entry in the stack is greater than the priority value of the entry in the holding register 10, then a swapping operation must take place at 50 to swap the contents of the stack at the location pointed to by the stack search pointer 14 with the contents of the holding register 10. This is done by taking the contents of the entry in the stack pointed to by the stack search pointer 14 and placing it in the temporary register 18 of the queue controller 9. Then, the contents of the holding register 10 is written into the stack at the location pointed to by the stack search pointer 14. Next, the contents of the temporary register 18 is written to the holding register 10. After this swapping operation has taken place, the contents of the holding register has a high probability of containing the highest priority entry for any entry in the stack. By the time the loop of FIG. 4 completes and all of the entries in the stack have been so compared, the contents of the holding register is guaranteed to have the highest priority of all of the entries in the stack 16.

As can be seen in the flow diagram of FIG. 4, if the comparison carried out by the compare logic 20 indicates that the contents of the stack at the entry pointed to by the stack search pointer 14 is not greater than the contents of the holding register 10, then the process continues where an examination is made at 52 as to whether a new entry has been input to the queue controller 9 which is to be written into the stack 16. This point is also reached at the end of the swapping operation previously described. As is seen by the flow diagram of FIG. 4, the input register 22 is interrogated to determine if any new data is ready to be added to the stack. If the input register 22 is determined to have a new entry which includes both the priority portion and the pointer portion, then a comparison operation must take place to determine if the priority of the new entry is greater than that contained in the holding register 10. Thus, the compare logic 20 compares at 54 the priority portion of the contents of the input register 22 with the priority portion of the contents of the holding register 10 and if the priority of the new data is greater than that of the holding register, then the new data is written to the holding register 10. This is accomplished as follows. First, at 56 the value of the top of stack pointer 12 Imax is incremented by 1. Then, the contents of the holding register 10 is written to the location in the stack 16 pointed to by the top of stack pointer 12. Thereafter, the new data in the input register 22 is written to the holding register 10 at 58. In this manner, the probability is quite high that the holding register will contain the entry with the highest priority value of any value in stack 16.

If, instead, the new data has a priority portion which is not greater than the contents of the holding register 10, then the new data is written to the stack. This is done in the following manner at 60. The value of the top of stack pointer 12, Imax is incremented by 1. Then, the new data in the input register 22 is written to the location in the stack 16 pointed to by the top of stack pointer 12. Thereafter, the flow diagram returns to point B shown in the flow diagram. Point B is the point in the flow diagram where the process would have gone if there had been no new data input to the queue controller 9. At point B, a further interrogation is made 62 to determine if the entire stack has been run through this comparison process. The stack search pointer 14 is given the variable name I. The flow diagram asks whether the value of I is 0. That is, has the bottom of the stack been reached? If the bottom of the stack has in fact been reached at 64, then the flow diagram goes to the beginning of the flow diagram at point A, and waits until either a new piece of data is ready to be written into the queue controller 9, or alternately, until the next control portion of the time frame occurs. Instead, if the value of I for the stack search pointer 14 is not 0, then the value of I is decremented by 1 at 66 and the loop continues by examining whether the next lower entry in the stack 16 has its priority value greater than the holding register 10. In this manner, when the loop is completed, it is guaranteed that the contents of the holding register 10 has a priority value which is greater than the priority value of any of the entries of the stack 16. The contents of the holding register 10 is then made immediately available for the application, such as the local area network priority contention resolution application described above.

Figure 6:
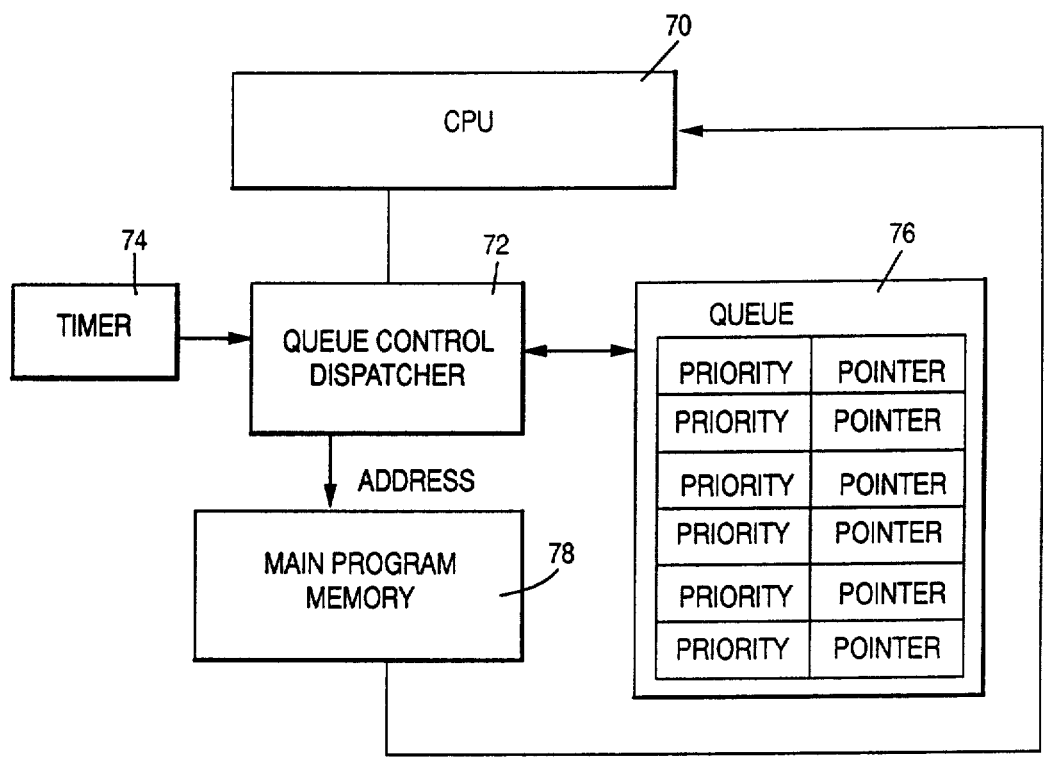
FIG. 6 is an architectural diagram of a work step data processor architecture within which priority assignments can be managed by means of the invention.

FIG. 6 illustrates an alternate application for the invention in a data processor which is based upon the work step architecture. In the work step architecture, a multiprogramming operation takes place where multiple programs or program segments are each given a priority value and the time dimension is divided into a sequence of equal time intervals. Prior to each time interval, the program or program segment which has the highest priority is selected for execution during the next interval. As is shown in FIG. 6, an example computer architecture to carry out a work step architecture operation is shown. The CPU 70 is the shared data processing resource and is connected to a queue control dispatcher 72 which has a timer 74 input thereto which divides up the time dimension into a sequence of equal time intervals. Also connected to the queue control dispatcher is a priority stack such as the stack 76 previously described. Also connected to the queue control dispatcher is a large memory 78 which has an address input connected to the queue control dispatcher and which stores the programs or program segments whose priority are identified by the queue control dispatcher as being the largest and therefore the program being the candidate for execution in the next time interval. The queue controller 9 of FIG. 2 is contained in the queue control dispatcher of FIG. 6. Queue controller 9 operates in a manner similar to that previously described for the local area network application of FIG. 5, in that it has queue function selects input to it requesting the identity of the next program whose priority is the highest and which is to be selected for execution during the next time interval. The operation of the queue controller 9 in the application of the work step architecture of FIG. 6 is substantially the same as was that described for the local area network application of FIG. 5. In particular, if the assignment of new programs or program segments to the queue control dispatcher of FIG. 6 is asynchronous with the occurrence of the succession of time intervals established by the timer of FIG. 6, the queue controller 9 can accommodate this since the queue controller 9 makes available in its holding register 10 the identity of the highest priority program which is available at the beginning of every time interval, and yet the queue controller 9 is always available for the addition of new entries to the priority stack 16, as has been previously described.

Although a specific embodiment of the invention has been disclosed, it will be understood by those having skill in the art, that changes can be made to that specific embodiment without departing from the spirit and the scope of the invention.

What is claimed is:

1. In a communication node of a local area network comprising at least a processing means and a memory means a method for maintaining a priority queue for messages to be transmitted, comprising using said processing means for the steps of:

reading during a network contention interval, the contents of a holding register having a data portion related to a first message to be transmitted and a priority portion related to the priority of said first message, in response to a request for a highest priority message;

reading a top element from the top of an unsorted stack of elements stored in said memory means, each element of said stack containing a data portion related to a message to be transmitted and a priority portion related to the priority of the message, said top element being pointed to by a top of stack pointer, and writing the contents of said top element related to a second message to be transmitted, including a priority portion related to the priority of said second message, to said holding register;

searching during a period following said network contention interval, said plurality of elements in said unsorted stack by sequentially locating consecutively adjacent elements therein which are sequentially pointed to by a stack search pointer which is initially set equal to said top of stack pointer, and comparing the priority portion of an element pointed to by said stack search pointer, related to a third message to be transmitted, with said priority portion of the contents of said holding register;

swapping the contents of said element in said stack pointed to by said stack search pointer with the contents of said holding register, when the priority portion of said contents of said element related to said third message is greater than the priority portion of the contents of said holding register;

determining during said period following said network contention interval, if a new element is to be written into said stack, having a data portion related to a fourth message to be transmitted and a priority portion related to the priority of said fourth message;

comparing said new element to be written to said stack with the contents of said holding register to determine if the priority portion of said new element is greater than the priority portion of the contents of said holding register;

incrementing by unity the contents of said top of stack pointer and writing the contents of said holding register to a location is said stack now pointed to by said top of stack pointer when said priority portion of said new element is greater than the priority portion of the contents of said holding register, and further writing said new element to said holding register;

writing said new element to said stack when said priority portion of said new element is not greater than the priority portion of said contents of said holding register;

repeating said comparing of each element in said stack with the contents of said holding register until all said elements in said stack have been so compared;

whereby stored date related to a message with the highest priority at said communication node, is accessible in said holding register.

2. In a communication node of a local area network comprising at least a processing means and a memory means, a method for maintaining a priority queue for messages to be transmitted, comprising using said processing means for the steps of:

outputting under the direction of a queue controller during a network contention interval, the contents of a holding register having a data portion related to a first message to be transmitted and a priority portion related to the priority of said first message in response to a request for a highest priority message;

reading a top element from the top of an unsorted stack of elements stored in said memory means, each element of said stack containing a data portion related to a message to be transmitted and a priority portion relating to the priority of the message, and writing the contents of said top element related to a second message to be transmitted, including a priority portion related to the priority of said second message, to said holding register;

searching during a period following said network contention interval, said plurality of elements in said stack by comparing the priority portion of a first element therein with the priority portion of the contents of said holding register;

swapping the contents of said first element in said stack with the contents of said holding register, when the priority portion of said contents of said first element is greater than the priority portion of the contents of said holding register;

determining during said period following said network contention interval, if a new element is to be written into said stack having a data portion related to a third message to be transmitted and a priority portion related to the priority of said third message;

comparing said new element to be written to said stack with the contents of said holding register to determine if the priority portion of said new element is greater than the priority portion of the contents of said holding register;

writing the contents of said holding register to said stack when said priority portion of said new element is greater than the priority portion of the contents of said holding register, and further writing said new element to said holding register;

writing said new element to said stack when said priority portion of said new element is not greater than the priority portion of said contents of said holding register;

repeating said comparing of each element in said stack with the contents of said holding register until all said elements in said stack have been so compared;

whereby stored data related to a message with the highest priority at said communication node, is accessible in said holding register.

3. In a data processing system having a plurality of programs therein to be executed in a multiprogramming mode, a method for maintaining a priority queue for programs to be executed, comprising using said processing means for the steps of:

outputting under the direction of a queue controller during a selection interval, the contents of a holding register having a data portion related to a first program to be executed and a priority portion related to the priority of said first program in response to a request for a highest priority program;

reading a top element from the top of an unsorted stack of elements stored in said memory means, each element of said stack containing a data portion related to a program to be executed and a priority portion related to the priority of the program, and writing the contents of said top element related to a second program to be executed, including a priority portion related to the priority of said second program, to said holding register;

searching during a period following said selection interval, said plurality of elements in said stack by comparing the priority portion of a first element therein with the priority portion of the contents of said holding register;

swapping the contents of said first element in said stack with the contents of said holding register, when the priority portion of said contents of said first element is greater than the priority portion of the contents of said holding register;

determining during said period following said selection interval, if a new element is to e written into said stack, having a data portion related to a third program to be executed and a priority portion related to the priority of said third program;

comparing said new element to be written to said stack with the contents of said holding register to determine if the priority portion of said new element is greater than the priority portion of the contents of said holding register;

writing the contents of said holding register to said stack when said priority portion of said new element is greater than the priority portion of the contents of said holding register, and further writing said new element to said holding register;

writing said new element to said stack when said priority portion of said new element is not greater than the priority portion of said contents of said holding register;

repeating said comparing of each element in said stack with the contents of said holding register until all said elements in said stack have been so compared;

whereby stored data related to a program with the highest priority of said plurality of programs in said data processing system, is accessible in said holding register.

* * * * *